Sept. 13, 1960 W. G. TOLAND 2,952,325
DISK GANG MOUNTING MEANS
Filed June 24, 1957 2 Sheets-Sheet 1
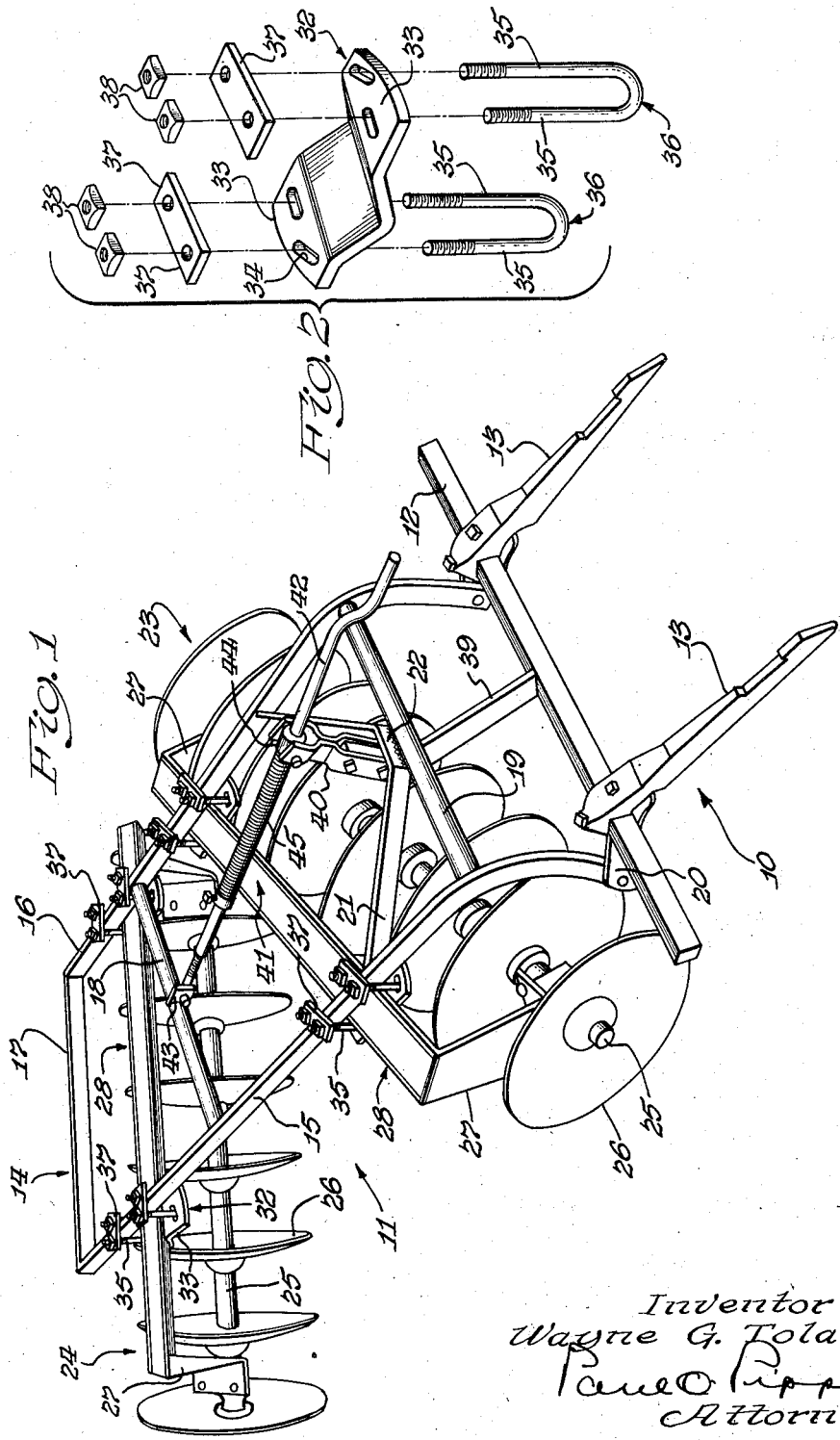
Inventor
Wayne G. Toland
Paul O. Pippel
Attorney

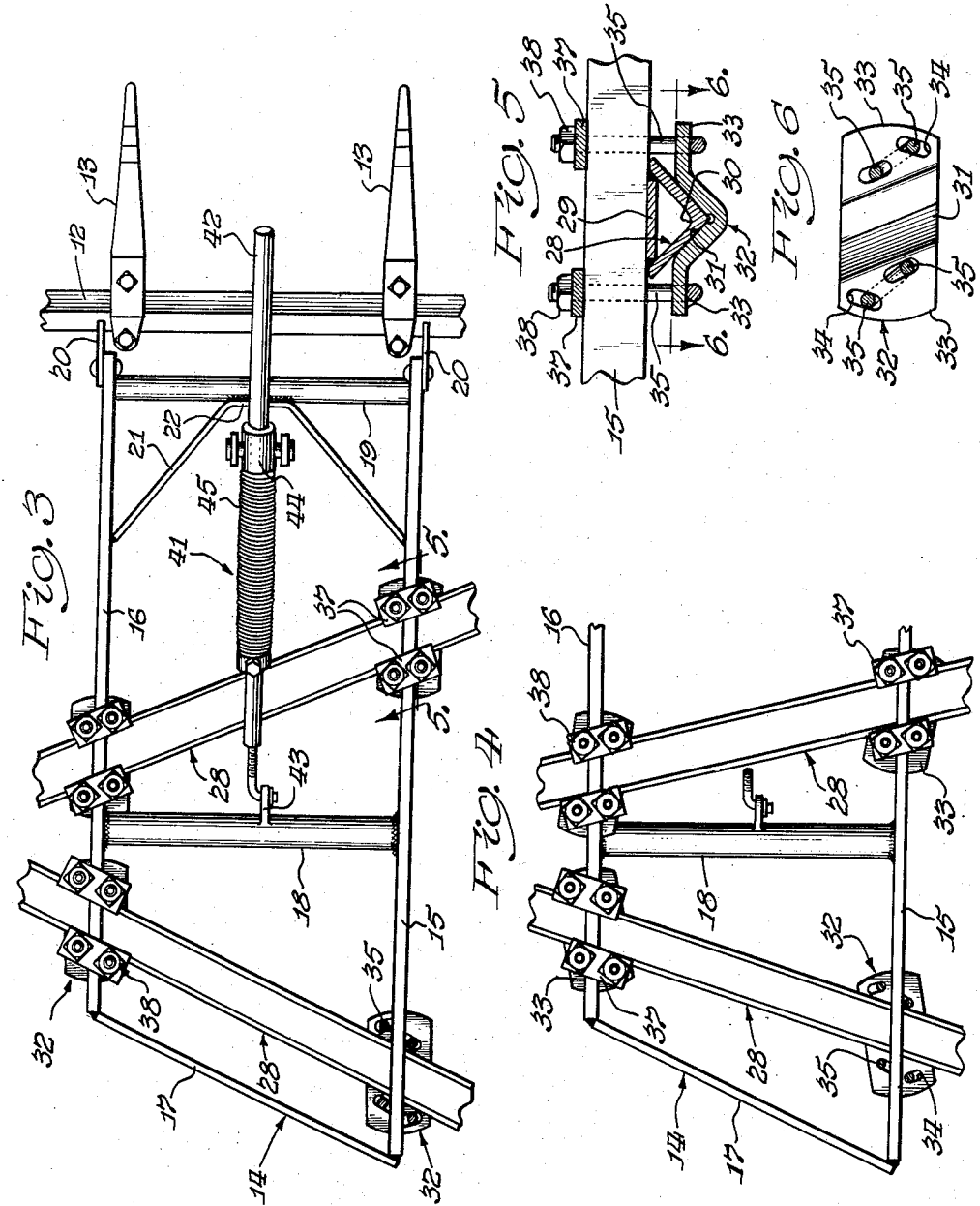

United States Patent Office 2,952,325
Patented Sept. 13, 1960

2,952,325
DISK GANG MOUNTING MEANS
Wayne G. Toland, Stockton, Calif., assignor to International Harvester Company, Chicago, Ill., a corporation of New Jersey
Filed June 24, 1957, Ser. No. 667,343
2 Claims. (Cl. 172—596)

This invention relates to implement clamping means and particularly to means for adjustably mounting on a frame to the tool gangs of a disk harrow or the like.

An object of the invention is to provide in a disk harrow comprising relatively angled disk gangs, improved means for adjusting the angle between said gangs.

Another object of the invention is to provide novel clamping means for securing the disk gangs of an offset harrow to a supporting frame to readily accommodate laterally offsetting the gangs and angularly adjusting them to selected positions relative to the frame.

Another object of the invention is to provide in a disk harrow wherein a pair of disk gangs are mounted on a frame and securely held in adjusted relatively angled positions, improved attaching means for securing the gangs to the frame in their different positions including clamping elements which conform to the shape of the supporting frame so that they are angled with the gangs and hold them firmly in their adjusted positions.

Other objects and advantages of the invention will become clear from the following detailed description when read in conjunction with the accompanying drawings wherein:

Figure 1 is a perspective view of an offset disk harrow incorporating the features of this invention;

Figure 2 is an exploded view of the clamping means for adjustably securing the disk gangs to the supporting frame;

Figure 3 is a plan view of a portion of the structure shown in Figure 1 with parts removed, and partly in section;

Figure 4 is a detail, partly in section, of a portion of the structure shown in Figure 3 illustrating the position of the parts when the angle between the gangs has been changed;

Figure 5 is an enlarged view in section taken on the line 5—5 of Figure 3; and

Figure 6 is a section taken on the line 6—6 of Figure 5.

The implement shown in the drawings is an offset disk harrow adapted for direct connection to a tractor, not shown, and comprises a hitch frame 10 and a tool-carrying frame 11 articulately connected thereto for relative vertical pivoting. Hitch frame 11 comprises a transversely extending tool bar 12, square in cross-section, having adjustably secured thereto at laterally spaced locations a pair of forwardly projecting shaft members 13 serving as the means for connecting the implement to the propelling vehicle.

Tool carrier 11 includes a generally rectangular frame member 14 comprising laterally spaced bars 15 and 16 connected at their rear ends by a bracing bar 17. A cylindrical bracing bar 18 extends between and is affixed at its ends to the bars 15 and 16 near the rear end thereof, and another cylindrical bracing bar 19 connects bars 15 and 16 near their forward ends. The forward ends of the bars 15 and 16 curve downwardly and the lower ends thereof are pivotally connected to a pair of rearwardly and downwardly extending lugs 20 affixed to the hitch bar 12. Another bracing member 21 is arch-shaped. The ends of this member are secured to the frame bars 15 and 16 and extend forwardly and have a transverse portion 22 affixed to brace 19 centrally thereof.

A pair of relatively angled disk gangs 23 and 24 are supported from the frame member 14 and each comprises a laterally directed shaft 25 having mounted thereon a plurality of earth-working disks 26, the concave faces of the disks of forward gang 23 being directed diagonally forwardly and outwardly to the right of the direction of travel and the concave faces of the disks of rear gang 24 being directed diagonally outwardly to the left.

The harrow shown in the drawings is a right-hand offset harrow and the shafts 25 converge to the left of the direction of travel. Although the concave faces of the disks of gangs 23 and 24 face in opposite directions, the details of construction of the two gangs are substantially the same, and a description of one will suffice for both. Shaft 25 is suspended near its ends from a pair of hangers 27, the lower ends of which are secured to the shaft and the upper ends of which are affixed to the ends of a diagonally laterally extending support 28.

As clearly shown in Figure 5, supporting frame member 28 is triangular in section having a broad base 29 directed upwardly and engageable with the under edge of each of the bars 15 and 16. A broad engaging face is thus provided between the member 28 and the frame bars 15 and 16. Likewise, the bars 28 of gangs 23 and 24 can be adjusted independently laterally of the implement frame as well as angularly to vary the angle between the gangs.

The angle 30 opposite base 29 fits in a V-shaped notch 31 provided in and extending diagonally of a clamping element 32 having horizontal flange portions 33, each of which is provided with a pair of relatively angled slots 34.

Each pair of slots 34 is adapted to slidably receive the arms 35 of a U-bolt 36, the arms of the U-bolt being passed upwardly from below through the slots 34, straddling the associated bar 15 or 16 and through openings provided in a pair of clamping plates 37. The ends of the arms 35 of the U-bolts are threaded to receive nuts 38 by which the clamping element 32 is securely held to frame member 28 and the latter clamped firmly to the frame bar 15 or 16. By loosening the nuts 38 the lateral position of member 28 is readily varied by sliding it in the groove in clamping element 32 until it is again secured in its laterally adjusted position.

In securing angular adjustment of the disk gangs 23 and 24 from a position such as shown in Figure 3 to that shown in Figure 4, each of the members 28 is angularly adjusted relative to tool-carrying frame member 14 while retaining the same relationship between the member 28 and the clamping element 32. This is accomplished by virtue of the disposition of the U-bolts 36 in slots 34, the clamping element 32 being angularly adjustable with the member 28, the U-bolts remaining relatively stationary.

The clamping apparatus described makes for quick and easy adjustment of the disk gangs without dismantling the clamping parts and holds the disk gangs at the chosen angle under the severest operating conditions.

By virtue of the pivotal connection of the forward ends of bars 15 and 16 to lugs 20 of hitch frame 10, the tool-carrying frame 11 is capable of vertical swinging relative thereto to accommodate the implement to the contour of the ground over which it travels. A further connection is provided between the hitch frame 10 and tool frame 11 and this means includes an angularly shaped arm 39 affixed to and extending rearwardly and upwardly from tool bar 12 and having a vertically extending extension member 40 secured to its rear end. Arms 39 and 40 form a part of a spring pressure unit 41 which includes an adjusting member 42 connected between the bifurcated upper end of extension 40 and a lug 43 affixed to brace 18. Spring pressure unit 41 forms no part of this invention and further details of the construction thereof may be had by reference to copending U.S. application Serial No. 667,368, filed June 24, 1957. It may be briefly noted, however, that member 42 is slidable in a sleeve 44 which is pivotally mounted in the extension 40 and engages a spring 45 which resiliently opposes upward swinging of tool carrier 11 relative to hitch frame 10. The upwardly bent end of arm 39 engages the transverse portion 22 of brace 21 and acts as a stop to limit downward swinging of the tool carrier 11.

It is believed that the mounting means for the disk gangs of this invention will be clearly understood from the foregoing description. It should likewise be understood, however, that modifications may be made in the invention without departing from the spirit thereof or the scope of the appended claims.

What is claimed is:

1. In an offset disk harrow having a frame and a pair of relatively angled disk gangs each of which includes a plurality of disks, means for mounting said disks on the frame comprising an elongated member supporting each of said gangs, said member being triangular in section with one of its sides engageable with the under surface of said frame, and clamping means adjustably securing each of said members to the frame comprising, a clamping plate having a portion parallel to the frame and a notch therein conforming to the shape of and adapted to slidably receive the triangular lower portion of said member, whereby said member and said clamping plate are angularly adjusted as a unit relative to the frame, said plate having spaced pairs of relatively angled elongated openings formed therein, bolts carried by the plate and slidably receivable in said openings, whereby said plate is angularly adjustable relative to the bolts, and means for securing said bolts to the frame.

2. In an offset disk harrow having a frame and a pair of relatively angled disk gangs each of which includes a plurality of disks, means for mounting said disks on the frame comprising an elongated member supporting each of said gangs, said member being triangular in section with one of its sides engageable with the under surface of said frame, and clamping means adjustable securing each of said members to the frame comprising, a clamping plate having a portion parallel to the frame and a notch therein conforming to the shape of and adapted to slidably receive the triangular lower portion of said member, whereby said member and said clamping plate are angularly adjusted as a unit relative to the frame, said plate having spaced pairs of relatively angled elongated openings formed therein on opposite sides of said notch and extending generally in the direction of adjustment of said member and clamping plate, and a pair of U-bolts carried by the plate having the arms thereof slidably receivable in adjacent openings, and means securing said bolts to the frame, the relative angling of said openings accommodating the angular adjustment of said member and said clamping plate relative to the U-bolts and to said frame.

References Cited in the file of this patent

UNITED STATES PATENTS

| | | |
|---|---|---|
| 313,073 | Hartman | Mar. 3, 1885 |
| 734,620 | Sears | July 28, 1903 |
| 1,634,650 | Coon | July 4, 1927 |
| 2,320,742 | Newkirk | June 1, 1943 |
| 2,587,494 | Love | Feb. 26, 1952 |
| 2,693,748 | Kiser | Nov. 4, 1954 |